United States Patent
Saxena et al.

(10) Patent No.: US 9,582,609 B2
(45) Date of Patent: Feb. 28, 2017

(54) SYSTEM AND A METHOD FOR GENERATING CHALLENGES DYNAMICALLY FOR ASSURANCE OF HUMAN INTERACTION

(75) Inventors: Ashutosh Saxena, Hyderabad (IN); Rajiv Tripathi, New Delhi (IN); Aparajith Srinivasan Vangal, Hyderabad (IN); Gurram Karthik, Khammam (IN)

(73) Assignee: Infosys Limited, Bangalore (IN)

( * ) Notice: Subject to any disclaimer, the term of this patent is extended or adjusted under 35 U.S.C. 154(b) by 189 days.

(21) Appl. No.: 13/072,374

(22) Filed: Mar. 25, 2011

(65) Prior Publication Data

US 2012/0166409 A1 Jun. 28, 2012

(30) Foreign Application Priority Data

Dec. 27, 2010 (IN) .......................... 3965/CHE/2010

(51) Int. Cl.
*G06F 7/00* (2006.01)
*G06F 17/30* (2006.01)
*H04N 21/475* (2011.01)
*G09B 7/04* (2006.01)

(52) U.S. Cl.
CPC .......... *G06F 17/30976* (2013.01); *G09B 7/04* (2013.01); *H04N 21/4758* (2013.01)

(58) Field of Classification Search
None
See application file for complete search history.

(56) References Cited

U.S. PATENT DOCUMENTS

| | | | |
|---|---|---|---|
| 5,878,423 A * | 3/1999 | Anderson et al. | 707/999.001 |
| 6,094,649 A * | 7/2000 | Bowen et al. | 707/711 |
| 7,139,740 B2 | 11/2006 | Ayala | |
| 7,139,916 B2 | 11/2006 | Billingsley et al. | |
| 7,149,801 B2 | 12/2006 | Burrows et al. | |
| 7,231,657 B2 * | 6/2007 | Honarvar et al. | 726/2 |
| 8,407,078 B1 * | 3/2013 | Caputo et al. | 705/7.27 |

(Continued)

OTHER PUBLICATIONS

"/bj2bot: Bejeweled 2 Bot for Xbox 360 Achievements", Jun. 4, 2007, 13 pages, <http://www.brains-n-brawn.com/default.aspx?vDir=aicaptcha>.

(Continued)

*Primary Examiner* — Jau-Shya Meng
(74) *Attorney, Agent, or Firm* — Klarquist Sparkman, LLP (57) ABSTRACT

The invention provides a method, a system, and a computer program product checking for human interaction dynamically to enable access to a resource in a computing environment. The method comprises collecting a plurality of objects. For each object, a plurality of properties is defined. A set of objects is selected from the plurality of collected objects. Thereafter, queries are generated based on the properties of the selected objects. Queries which have a non-unique or ambiguous response are removed. One of the remaining queries is randomly selected. The answer to the query, based on properties of the selected objects, is stored. The selected set of objects and the selected query are presented to the user who is trying to gain access to the resource. The user is enabled access to the resource if the response received from the user is validated against the stored answer of the selected query.

21 Claims, 8 Drawing Sheets

(56) References Cited

U.S. PATENT DOCUMENTS

| | | | |
|---|---|---|---|
| 8,645,479 B2* | 2/2014 | Liu | G06F 17/279 704/251 |
| 2002/0120853 A1 | 8/2002 | Tyree | |
| 2002/0147724 A1* | 10/2002 | Fries et al. | 707/100 |
| 2003/0217052 A1* | 11/2003 | Rubenczyk | G06F 17/30643 |
| 2004/0059951 A1 | 3/2004 | Pinkas et al. | |
| 2004/0075681 A1* | 4/2004 | Anati | 345/738 |
| 2004/0199597 A1 | 10/2004 | Libbey et al. | |
| 2005/0065802 A1 | 3/2005 | Rui et al. | |
| 2005/0066201 A1 | 3/2005 | Goodman et al. | |
| 2005/0144064 A1 | 6/2005 | Calabria et al. | |
| 2005/0203878 A1* | 9/2005 | Brill et al. | 707/3 |
| 2005/0229251 A1 | 10/2005 | Chellapilla et al. | |
| 2006/0026246 A1 | 2/2006 | Fukuhara et al. | |
| 2006/0047766 A1 | 3/2006 | Spadea | |
| 2006/0080059 A1* | 4/2006 | Stupp et al. | 702/120 |
| 2006/0095578 A1 | 5/2006 | Paya et al. | |
| 2007/0005500 A1 | 1/2007 | Steeves et al. | |
| 2007/0026372 A1 | 2/2007 | Huelsbergen | |
| 2007/0043617 A1 | 2/2007 | Stein et al. | |
| 2007/0043681 A1 | 2/2007 | Morgan et al. | |
| 2007/0073655 A1* | 3/2007 | Chen et al. | 707/3 |
| 2010/0114604 A1* | 5/2010 | Bernstein | 705/3 |
| 2010/0114944 A1* | 5/2010 | Adler et al. | 707/770 |
| 2011/0150267 A1* | 6/2011 | Snelling et al. | 726/2 |
| 2011/0302172 A1* | 12/2011 | Chandrasekar | G06F 17/3064 707/748 |
| 2012/0030231 A1* | 2/2012 | Cropper | 707/769 |
| 2012/0284105 A1* | 11/2012 | Li | 705/14.23 |

OTHER PUBLICATIONS

"[Web Security] Defeating CAPTCHAs via Averaging (fwd)", bugtraq at cgisecurity.net, Jan. 29, 2007, 2 pages, <http://www.cip.physik.uni-muenchen.de/~wwieser/misc/captcha/>.

"Breaking CAPTCHA without OCR", Nov. 30, 2005, <http://www.puremango.co.uk/cm_breaking_captcha_115.php>, 1 page.

"CAPTCHA asp.net Web Control (English)", G4n GURU4.net, Jul. 18, 2006, 5 pages, <http://www.guru4.net/english/article/captcha/default.aspx>.

"CAPTCHA: Telling Humans and Computers Apart Automatically", The Official CAPTCHA site, Jan. 3, 2010, 4 pages, <http://www.captcha.net/>.

"CAPTCHAs in phpBB", phpBB—Blog—CAPTCHAs in phpBB, posted by Kellanved, Aug. 28, 2008, 9pages, <http://blog.phpbb.cc/articles/captcha/>.

"Defeating Captcha 430", posted by CmdrTaco on Wednesday Aug. 25, 2005, pp. 1-30, <http://it.slashdot.org/article.pl?sid=05/08/24/1629213&from=rss>.

"Implicit CAPTCHAs", Document Recognition and Retrieval XII, Jan. 16-20, 2005, San Jose, California, USA, Proceedings. SPIE 2005 SPIE Proceedings ISBN 0-8194-5649-7, pp. 191-196.

"Neural Park: Captcha this!", Nov. 1, 2006, 4 pages, <http://www.neuralpark.com/blog/2006/11/01/captcha-this/>.

"Petmail Documentation: Petmail Design", design.html, v 1.5, Jul. 21, 2005, papges 1-19, <http://petmail.lothar.com/design.html>.

"Phishing Activity Trends Report", Anti-Phising Working Group, Jul. 2005, pp. 1-8, <http://docs.apwg.org/reports/APWG_Phishing_Activity_Report_Jul_05.pdf>.

"PWNTCHA—CAPTCHA Decoder", Caca Labs, Decmeber 4, 2009, 5 pages, <http://caca.zoy.org/git/pwntcha.git>.

"The State of Spam", A Monthly Report, Jan. 2007, Symantec Messaging and Web Security, <http://www.symantec.com/avcenter/reference/Symantec_Spam_Report_-_January_2007.pdf>.

A CAPTCHA Server Control for asp.net, Code Project, by wumpus1, Jan. 31, 2007, 6 pages, <http://www.codeproject.com/aspnet/CaptchaControl.asp>.

Atwood, Jeff, "Coding Horror" CAPTCHA Effectiveness, Oct. 25, 2006, pp. 1-29, <http://www.codinghorror.com/blog/archives/000712.html>.

Baird, et al., "Implicit Captchas" , Sep. 22, 2009, <http://biblioteca.universia.net/html_bura/ficha/params/implicit-captchas/id/47962845.html>.

BotDetect CAPTCHA Generator Homepage, captcha.com, May 1, 2013, 2 pages, <http://www.lanapsoft.com/products.html>.

CAPTCHA Image, by BrainJar, CODE Project, Feb. 9, 2004, 6 pages, <http://www.codeproject.com/Articles/5947/CAPTCHA-Image>.

CAPTCHA: Definition from Answers.com, 2013, 10 pages,<http://www.answers.com/topic/captcha-1>.

Dynamic image generation in custom controls, Blogs / Fritz Onion, 2005, 6 pages, <http://pluralsight.com/blogs/fritz/archive/2005/02/11/5789.aspx>.

Festa, "Spam-bot tests flunk the blind", CNET.news.com, published Jul. 2, 2003, 6 pages, <http://news.com.com/2100-1032-1022814.html>.

G. Mori and J. Malik, "Breaking a Visual CAPTCHA", Sep. 2, 2004, 4 pages,<http://www.cs.sfu.ca/~mori/research/gimpy/>.

Kandula et al., "Botz-4-Sale: Surviving Organized DDoS at Crowds", Proceedings of the 2nd Symposium on Networked Systems Design and Implementation, May 2-4, 2005, Boston, MA, USA, 20 Pages.

Kellner, Peter, "The ultimate CAPTCHA CustomServer Control", Aug. 20, 2006, 24 pages, <http://peterkellner.net/2006/08/20/the-ultimate-captcha-custom-server-control/>.

Lopresti, Daniel, "Leveraging the CAPTCHA Problem", Department of Computer Science and Engineering Lehigh University, Bethlehem, PA, presented at the Second International Workshop on Human Interactive Proofs, May 2005, pp. 1-15, <http://www.cse.lehigh.edu/~lopresti/Publications/2005/hip05.pdf>.

May, Matt, "Inaccessibility of CAPTCHA", Alternatives to Visual Turing Tests on the Web W3C Working Group Note Nov. 23, 2005, 10 pages, <http://www.w3.org/TR/2005/NOTE-turingtest-20051123/>.

Mlemos, "CAPTCHA harder to break using animations", via phpclasses.org, published Dec. 6, 2006, 1 page, <http://www.dzone.com/links/captcha_harder_to_break_using_animations.html>.

Paul Lockwood's technology focused blog, Hands on.Net Architect in Alpharetta, GA, Category Archives: Other, posted on Jul. 3, 2005 by dotnetworkaholic, 2 pages, <http://blogs.clearscreen.com/migs/archive/2004/11/10/575.aspx>.

Turing, "The Alan Turing Internet Scrapbook", The Turing Test, 1950, 7 pages, <http://www.turing.org.uk/scrapbook/test.html>.

* cited by examiner

| Object | Properties |
|---|---|
| 1.  | 1. Number of Sides:0<br>2. Number of partitions: 4<br>3. Pair of equal sides: 0<br>4. Pair of equal partitions: All are equal |
| 2.  | 1. Number of sides: 4<br>2. Number of partitions:2<br>3. Pair of equal sides:2<br>4. Pair of equal partition:2 |
| 3.  | 1. Number of Sides:4<br>2. Number of partitions:2<br>3. Pair of equal sides:2<br>4. Pair of equal partition:2 |
| 4.  | 1. Number of sides:3<br>2. Number of partitions:0<br>3. Pair of equal sides:1<br>4. Pair of equal partition: 0 |
| 5.  | 1. Number of sides:6<br>2. Number of partitions:0<br>3. Pair of equal sides: All sides equal<br>4. Pair of equal partition: 0 |
| 6.  | 1. Number of sides:0<br>2. Number of partitions:0<br>3. Pair of equal sides:0<br>4. Pair of equal partitions:0 |

| Object | Properties |
|---|---|
| 1.  | 1. Number of legs : 4<br>2. Number of Horns : 0<br>3. Eating habits: Carnivorous<br>4. Natural Environment: Land animal |
| 2.  | 1. Number of legs : 4<br>2. Number of Horns : 0<br>3. Eating Habits: Herbivore<br>4. Natural Environment : Land animal |
| 3.  | 1. Number of legs : 0<br>2. Number of Horns : 0<br>3. Eating Habit: Carnivorous<br>4. Natural Environment : Aquatic animal |
| 4.  | 1. Number of legs : 4<br>2. Number of Horns : 1<br>3. Eating Habit: Herbivore<br>4. Natural Environment : Land animal |
| 5.  | 1. Number of legs : 4<br>2. Number of Horns : 0<br>3. Eating Habit: Carnivorous<br>4. Natural Environment : Land animal |
| 6.  | 1. Number of legs:4<br>2. Number of Horns: 0<br>3. Eating Habit: Carnivorous<br>4. Natural Environment: Land animal |
| 7.  | 1. Number of legs:4<br>2. Number of Horns:0<br>3. Eating habit: Herbivore<br>4. Natural Environment: Land animal |

SYSTEM AND A METHOD FOR GENERATING CHALLENGES DYNAMICALLY FOR ASSURANCE OF HUMAN INTERACTION

FIELD OF THE INVENTION

The present invention relates to computer system security. More specifically, it relates to generating challenges dynamically for assurance of human interaction in computing.

BACKGROUND OF THE INVENTION

Security is an important aspect in the computing environment today. Various security measures are used to protect resources from malicious attacks. One such security measure includes using CATPCHAs to protect resources. A CAPTCHA stands for Completely Automated Public Turing test to tell Computers and Humans Apart. This test is used to detect whether a party that is requesting access to a resource is a human or a computer. CAPTCHAs help in protecting resources intended for humans by preventing automated software or "bots" from utilizing or abusing the resources. Resources such as web-mails, blogs and online-voting are vulnerable of abuse and need protection against the abuse. For example, a bot can create thousands of email accounts if it gets access to a web-mail. This activity heavily uses the server bandwidth and severely impacts the quality of the service. Similarly, a bot that gets access to a blog or online-voting can make automated postings and voting, respectively. As a result, the blog can be used by the bot for malicious activities such as commercial promotion, harassment, or even otherwise for degrading the blog service. Similarly, automated voting by a bot can easily influence the results of online-voting.

The earlier used CAPTCHAs involved warping or distorting the image of text or set of characters such that it could be easily identified and reproduced by humans. Bots or computer programs often failed to recognize the information present in these images and could not reproduce the correct information. As these images were presented at random, one could not have any prior idea about the textual information being displayed. However, with improvement in Optical Character Recognition (OCR) techniques, decoding such CAPTCHAs became possible. CAPTCHAs were then improved by embedding a distorted text image on a background image to form an image. Thereafter, to further add to the complexity, the text was struck through using an angled line which made identification by a computer system even more difficult. Another option used for increasing the difficulty level was to crowd the characters together. In other words, some extent of overlap in characters was used to increase the CAPTCHA's difficulty level. However, further developments in the OCR technology have made it possible to break these CAPTCHAs as well.

Efforts were then made to make CAPTCHAs that are not prone to be broken by OCR techniques. The CAPTCHAs developed then were based on image recognition rather than character recognition. For instance, a CAPTCHA included three to four different images in which an object was presented to a user; it further asked him/her to identify the common object. At the back-end, creating such a CAPTCHA included having a number of images corresponding to a predefined object and displaying three to four randomly selected images to the user. However, techniques evolved to decode such CAPTCHAs also. Such CAPTCHAs are based on static logic or hard artificial intelligence problems. Once the logic has been identified, a bot can decode all CAPTCHAs generated by that system. The one-time identification of the logic can be performed manually with few attempts and then the solution can be given to a bot to break all CAPTCHAs generated by that system and gain access to resources.

In light of the limitations associated with the existing CAPTCHAs, a need exists for a challenge for assuring human interaction that is difficult for a computer program or a bot to decode.

BRIEF SUMMARY OF THE INVENTION

The invention provides a method, a system, and a computer program product checking for human interaction dynamically to enable access to a resource in a computing environment. The method comprises collecting a plurality of objects. For each of the selected objects, a plurality of properties is defined. For generating a challenge for assuring human interaction, a set of objects is selected from the plurality of collected objects. Thereafter, a plurality of queries is generated based on the properties of the selected objects. One or more queries are removed which have a non-unique or ambiguous response. One of the remaining queries is randomly selected. The answer to the query is stored, wherein the answer is based on the properties of the selected objects. The challenge is generated by presenting the selected set of objects and the selected query to a user trying to gain access to a resource. A response to the challenge is received from the user. Thereafter, the user is enabled access to the resource if the received response is validated against the stored answer for the selected query.

The method, the system, and the computer program product described above have a number of advantages. An advantage of the present invention is that it dynamically generates a challenge for the assurance of human interaction, thereby making the challenge difficult for a computer program to decode. Another advantage of the present invention is that the challenge is not based on a static logic/hard artificial intelligence, which also makes a computer program difficult to break. Yet another advantage of the present invention is that generated challenges are not based on usual "text on background" CAPTCHA techniques, thus making the existing OCR-based CAPTCHA breaking techniques ineffective against the challenges generated by the present invention.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DESCRIPTION OF THE DRAWINGS

The invention describes a method, a system, and a computer program product for checking for human interaction dynamically to enable access to a resource in a computing environment.

Figure 1:
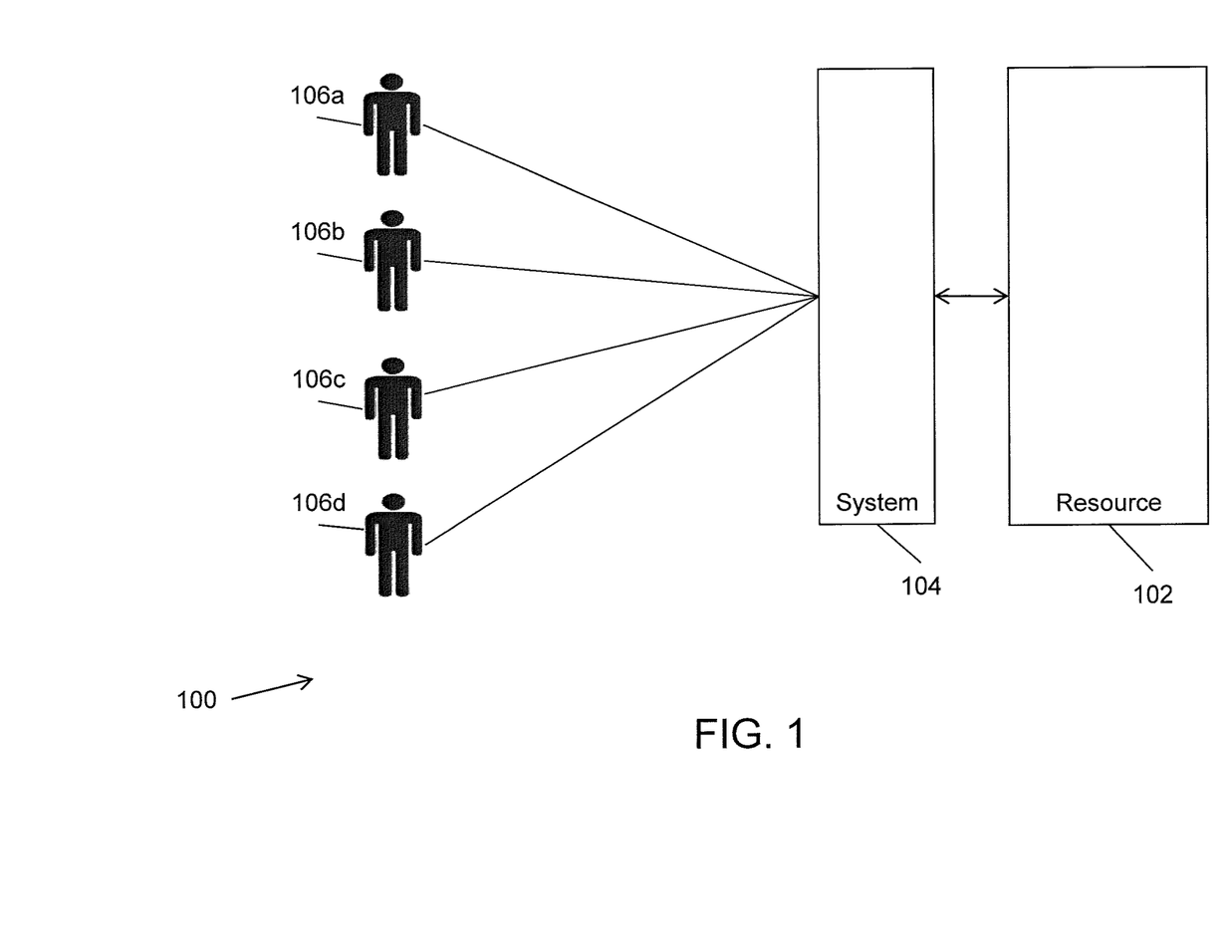
FIG. 1 illustrates an environment in which various embodiments of the present invention may be practiced

FIG. 1 illustrates an environment 100 in which various embodiments of the present invention may be practiced. Environment 100 includes a resource 102, a system 104, and multiple users 106a-d. Resource 102 is a resource in computing such as a website, a blog, webmail service, and Web 2.0-based applications. These resources require interaction with multiple users 106a-d. For example, a website providing inline polls require voting by multiple users to determine the polling outcome. Similarly, the basic objective of a blog or a Web 2.0-based website is to allow different users to share their comments or information. The present invention should not be considered limited to the mentioned examples of resources only. It will be apparent to a person skilled in the art that many other resources can be used in accordance with the embodiments of the present invention. System 104 is the system that generates a challenge to check for human interaction to enable access to resource 102. System 104 is later discussed in detail with reference to FIGS. 7 and 8. Users 106a-d are users that request access to resource 102. Each of users 106a-d can be a human or an automated program. Four users 106a-d have been shown in FIG. 1 for a representation of multiple users, and the present invention should not be considered limited to four users only. Users 106a-d are, hereinafter, referred to as user 106. User 106 requests access to resource 102 through system 104. System 104 checks user 106 and enable access to resource 102 only if system 104 assures that user 106 is a human. System 104 gives a dynamic challenge to user 106 and confirms that user 106 is a human if user 106 clears the challenge. The process of generating a challenge for user 106 is discussed in detail with reference to FIG. 2.

Figure 2:
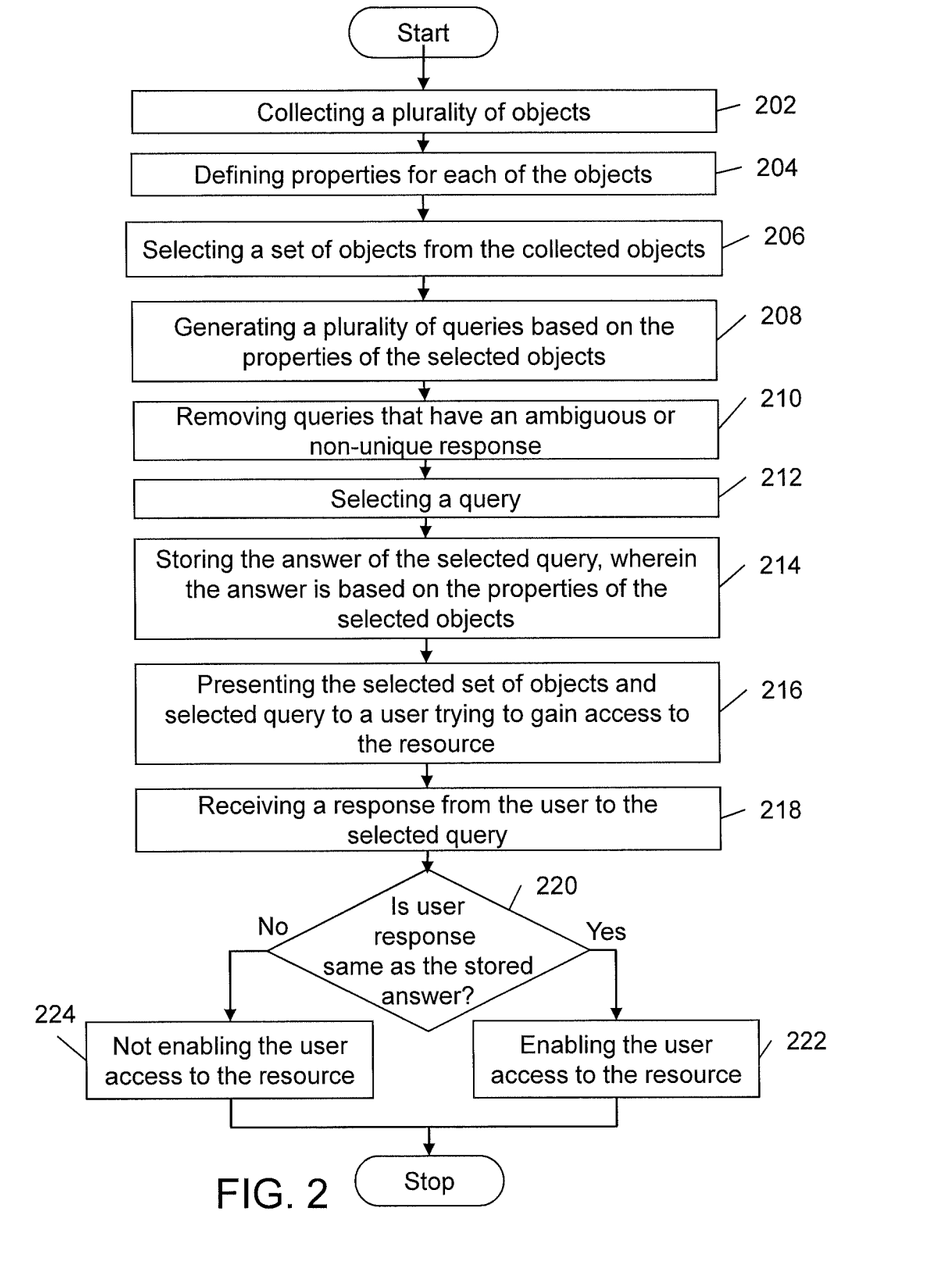
FIG. 2 is a flowchart for checking for human interaction dynamically to enable access to a resource in a computing environment, in accordance with various embodiments of the present invention.
Figure 3:
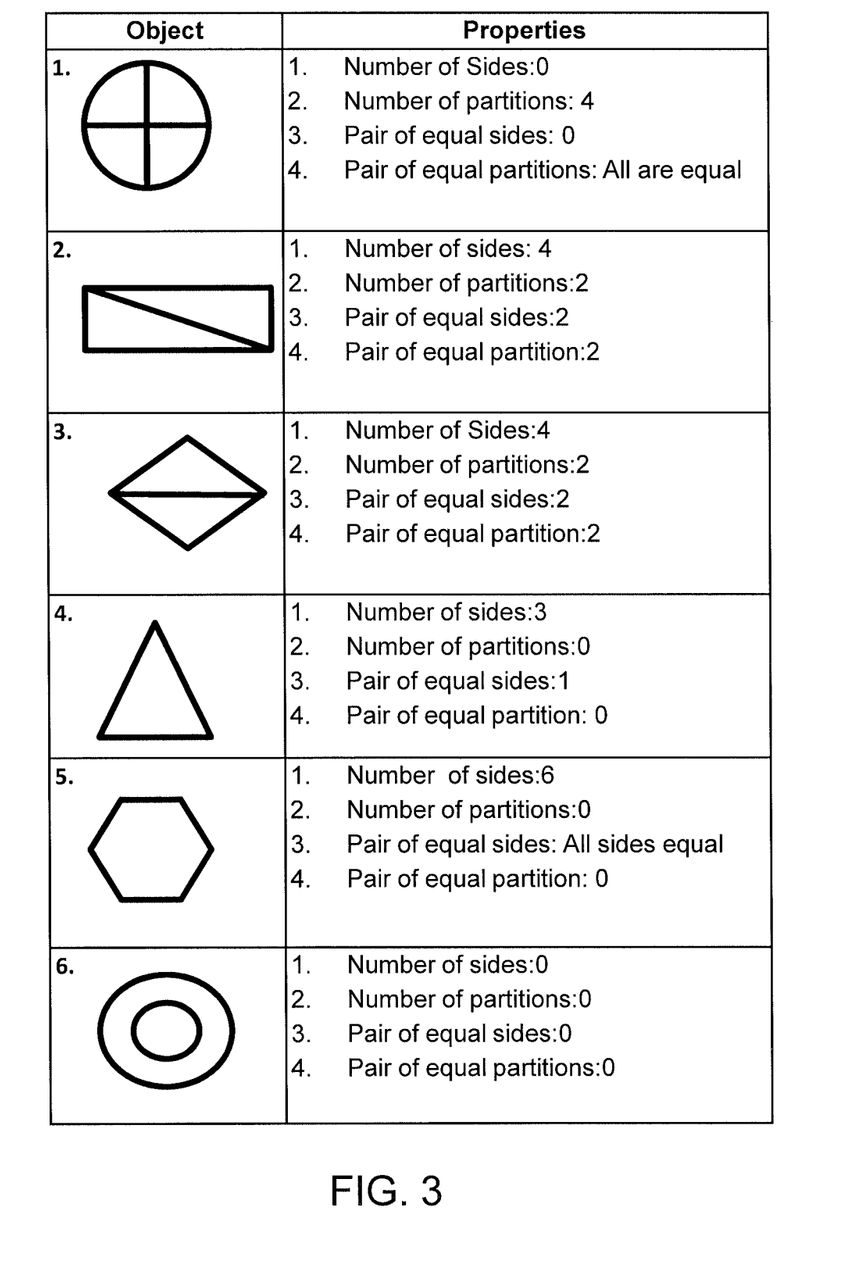
FIG. 3 shows an exemplary plurality of objects and their respective properties that are used to generate challenges in real time, in accordance with an embodiment of the present invention.

FIG. 2 is a flowchart for checking for human interaction dynamically to enable access to a resource in a computing environment, in accordance with various embodiments of the present invention. At 202, a plurality of objects is collected. Each object is an image. For example, the image of each geometrical figure shown in FIG. 3 is an object. At 204, a plurality of properties is defined for each of the collected objects. For example, four properties are defined for each object shown in FIG. 3. These properties are "number of sides", "number of partitions", "pair of equal sides", and "pair of equal partitions". The objects and properties shown in FIG. 3 are exemplary only and should not be construed to limit the invention. It will be apparent to a person skilled in the art that other projects and properties can be defined in accordance with an embodiment of the present invention. The objects and their properties are stored in a storage device such as a database. When user 106 requests access to resource 102, 206 to 224 shown in FIG. 2 are performed in real time. At 206, some objects stored in the storage devices are selected randomly. These selected objects and their properties are used to create a challenge to ascertain whether user 106 is a human or a computer program. For example, consider a case where the first four objects (objects 1, 2, 3 and 4) are selected. At 208, a plurality of queries is created based on the properties of the selected objects. Each of the plurality of queries is based on either an identical property or a non-identical property of objects within the selected objects. These queries are generated using a Natural Language Processing (NLP) algorithm. It will be apparent to a person skilled in the art that existing NLP algorithms include Lexical, Morphological, Syntactic and semantic analysis. Continuing with the example of selected objects, the following are some of the queries:

1. Which object has four partitions?
2. How many objects have exactly two partitions?
3. How many objects have more than two partitions?
4. Which object has the least number of sides?
5. Which two objects have the same number of pair of equal sides?
6. Which object has more than one pair of equal sides?

Each of the queries 1, 4, and 6 is based on a non-identical property, i.e., a property that makes the object distinct from other selected objects. Each of the queries 2, 3, and 5 is based on an identical property, i.e., a property that is common for different objects.

Figure 4:
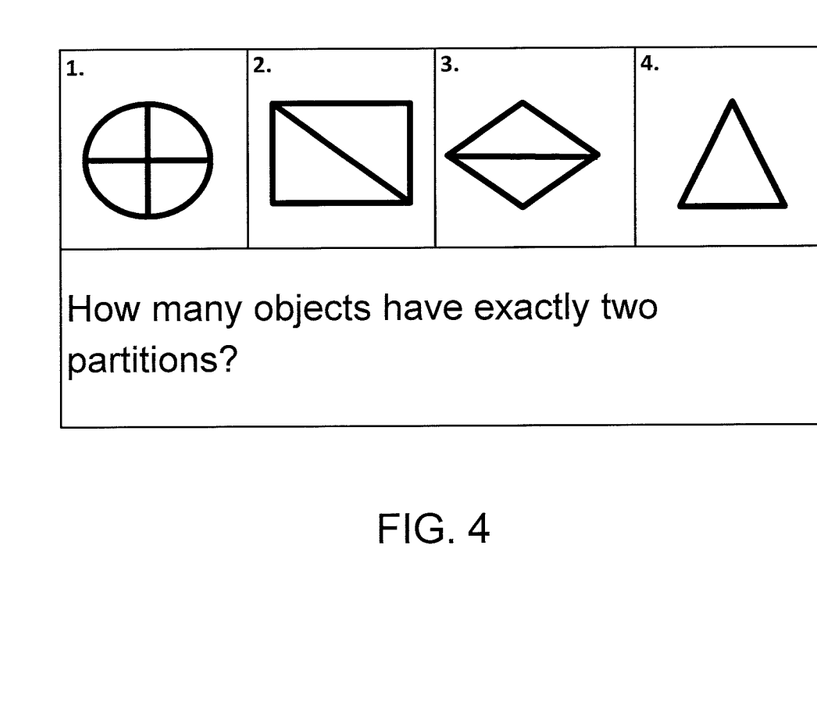
FIG. 4 is a challenge generated using the objects and their properties shown in FIG. 3, in accordance with an embodiment of the present invention.

Many queries similar to the given six queries are generated at 208. At 210, queries are removed from the generated queries that have ambiguous or non-unique responses. For example, query 6 given above can have two (more than one) correct answers—object 2 and object 3. Since this query does not have a unique response, it is deleted from the generated queries at 210. At 212, one of the remaining queries is selected randomly. At 214, the answer of the selected query is saved. For example, considering that system 104 selects query 2 at 210, the answer saved at 214 is "2". At 216, the selected objects and the selected query are presented to user 106 as a challenge. Continuing with the example of query 2, the challenge that is presented to user 106 at 216 is shown in FIG. 4. At 218, user 106 submits a response to the challenge. At 220, the response received from user 106 is checked against the saved answer of the query. If the response received matches with the saved answer, user 106 is enabled access to resource 102 at 222, else user 106 is denied access to resource 102 at 224.

Every time a user tries to access resource 102, 206 to 224 are performed. Since 208 to 224 are performed again, a set of objects is chosen again randomly and a query is randomly selected from the generated plurality of queries to formulate a challenge that is different than the earlier generated challenges. Since the challenges are formulated in real time and are not based on static logic/hard artificial Intelligence, they are less prone to be broken as compared with existing CAPTCHA challenges.

In an embodiment of the present invention, the objects as collected at 202 and their properties as defined at 204 can be modified anytime during the process. The modification may include adding or removing objects or properties. Any challenge that is generated after the modification of objects and properties will consider the modified objects and properties for generating challenges.

Figure 5:
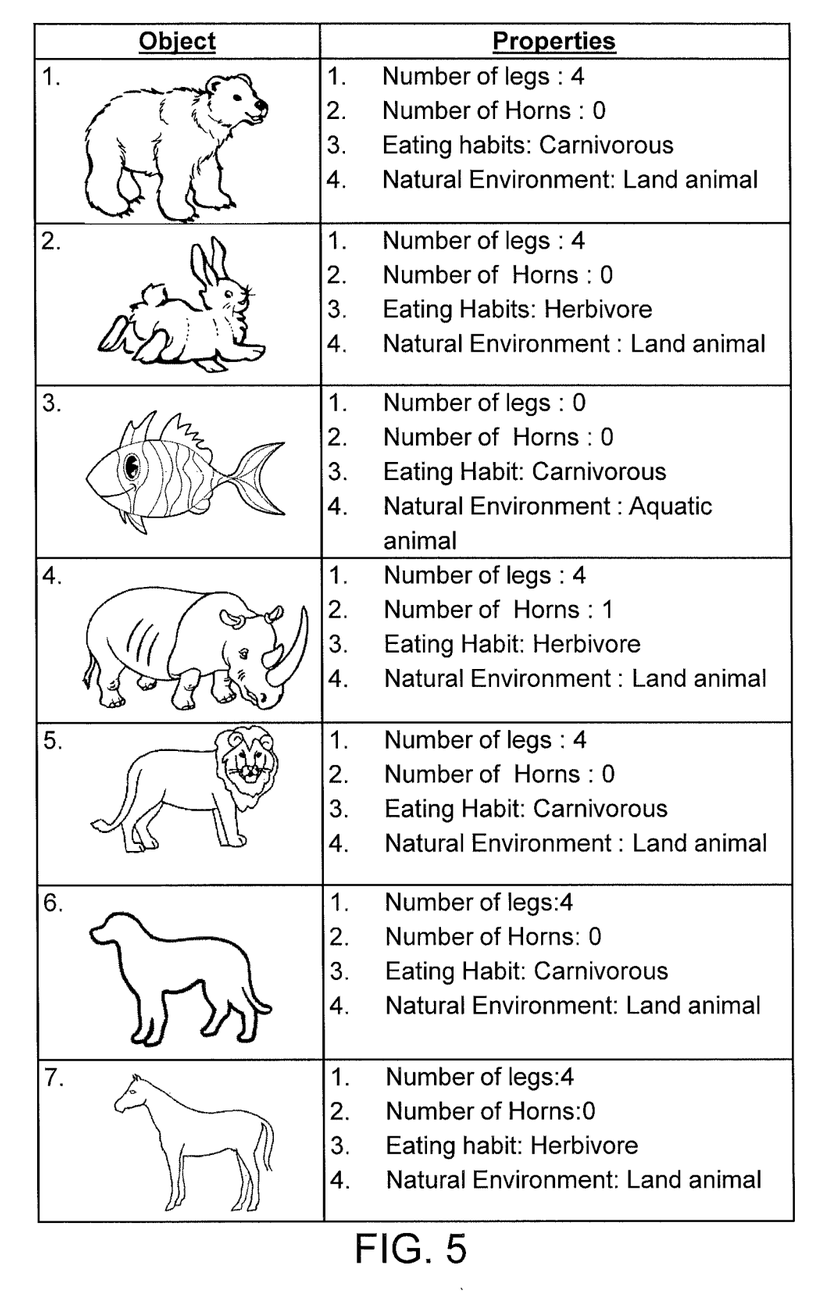
FIG. 5 shows another exemplary plurality of objects and their respective properties that are used to generate challenges in real time, in accordance with an embodiment of the present invention.

For clarity, the process explained with reference to FIG. 2 is again explained with another example. At 202, images of animals as shown in FIG. 5 are collected as objects. For each object, a plurality of properties is defined at 204. The properties defined for each object in FIG. 5 are "number of legs", "number of horns", "eating habits", and "natural environment". When user 106 requests access to resource 102, 206 to 224 shown in FIG. 2 are performed in real time. At 206, some objects are selected randomly of the objects defined at 202. For example, consider a case where all objects but object 2 (rabbit) shown in FIG. 5 are selected. At 208, a plurality of queries is created based on the properties of the selected objects. Continuing with the example of selected objects, the following are some of the queries:

1. Which of the given animals has a horn?
2. Which of the given animals is an aquatic animal?
3. How many of the given animals are herbivorous (vegetarian) animals?
4. How many of the given animals are carnivorous (non-vegetarian) animals?
5. Which of the given animals is a land animal?

Figure 6:
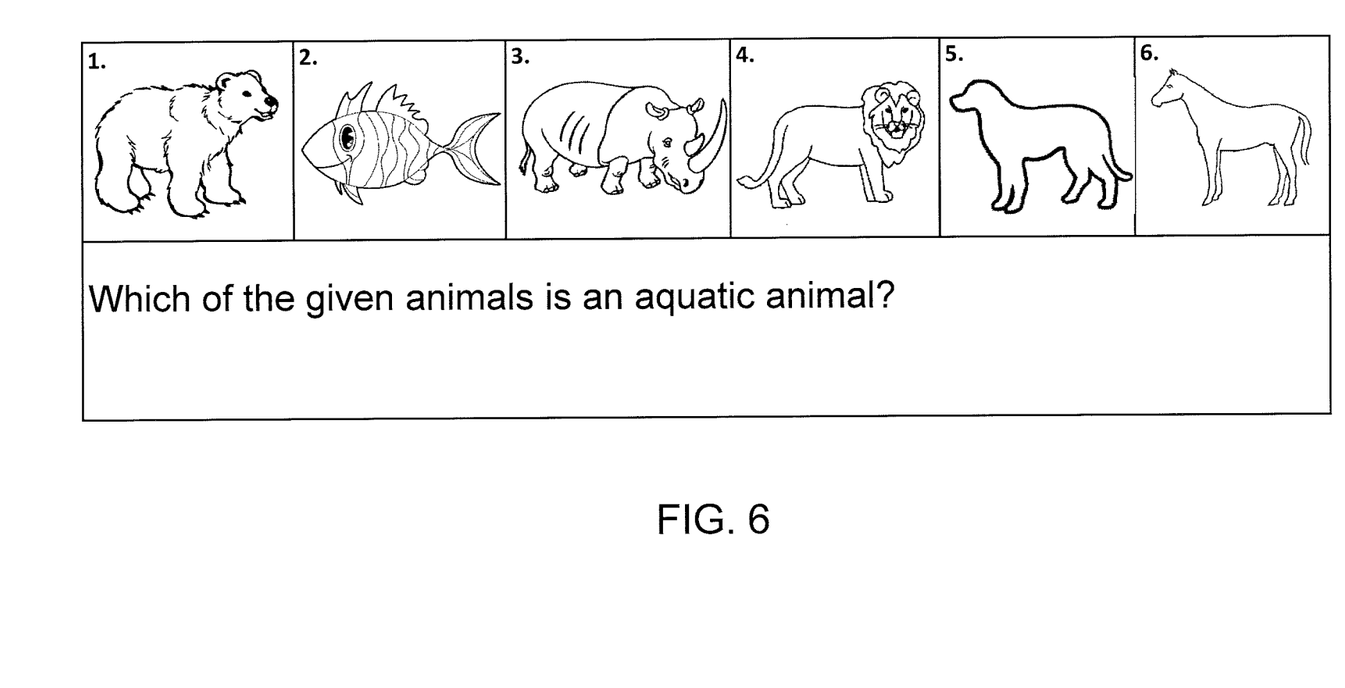
FIG. 6 is a challenge generated using the objects and their properties shown in FIG. 5, in accordance with an embodiment of the present invention.

Many queries similar to the given five queries are generated at 208. At 210, query 5 is removed from the generated queries because it has a non-unique response. At 212, one of the remaining queries is selected randomly, e.g., query 2. At 214, the answer of the selected query, i.e., fish, is saved. At 216, the challenge generated using the selected objects and the selected query is presented to user 106, as shown in FIG. 6. At 218, user 106 submits a response to the challenge. At 220, the response received from user 106 is checked against the saved answer of the query. If the response received is same as the saved answer, user 106 is enabled access to resource 102 at 222, else user 106 is denied access to resource 102 at 224.

In another embodiment of the present invention, the response of user 106 is accepted by system 104 only if user 106 responds within a predefined time limit. In other words, if user 106 provides a response to the challenge within the predefined time limit, system 104 performs 220 to 224 to check if the response is correct or not and to accordingly grant or deny access to resource 102. In case user 106 does not provide response within a predefined time limit of presenting the challenge, system 104 denies access to resource 102. The predefined time limit is decided and set in system 104 by an administrator. The predefined time limit is defined such that the time period is sufficient of a human to respond to the challenge and, in the same time, it is insufficient for a computer program or bot to understand the challenge and find an answer.

Figure 7:
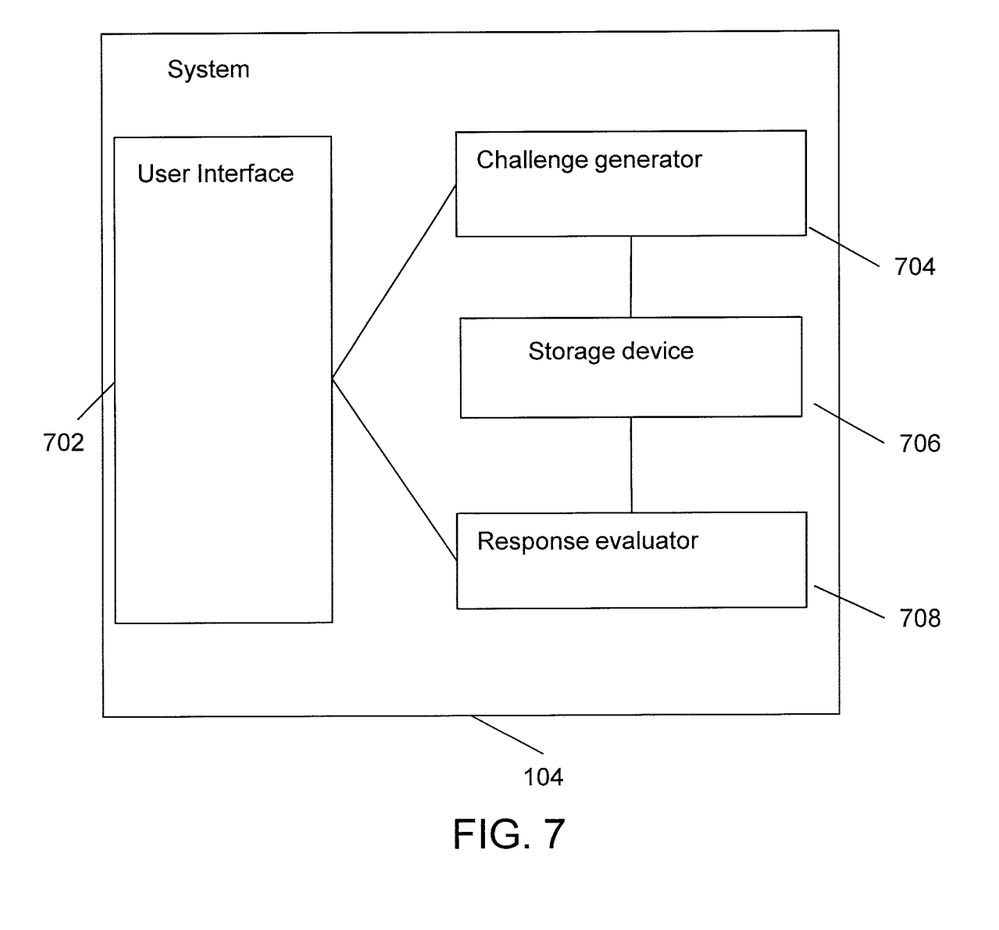
FIG. 7 is a block diagram of the system in accordance with an embodiment of the present invention.

FIG. 7 is a block diagram of system 104 in accordance with an embodiment of the present invention. System 104 includes a user Interface 702, a challenge generator 704, a storage device 706, and a response evaluator 708. When user 106 requests for resource 102, challenge generator 704 creates a challenge in real-time to check if the user 106 is a human or a computer program. Challenge generator 704 generates the challenge by performing 206 to 216 shown in FIG. 2. The objects and their properties used by challenge generator 704 to generate the challenge are predefined by an administrator. The objects and their properties are stored in storage device 706. Storage device 706 is also used by challenge generator 704 to store the answer to the query, which is used in the challenge. The challenge generated by challenge generator 704 is displayed to user 106 using user interface 702. User 106 provides response to the challenge to system 104 using user interface 702. Response evaluator 708 compares the received response from user 106 with the stored answer. Response evaluator 708 also determines the time lapsed since the presentation of the challenge to receive the response and accepts the response only if it is received within the predefined time limit. If the response is same as the stored answer and it is received within the predefined time limit, user 106 is enabled access to resource 102. Else user 106 is denied access to resource 102.

Figure 8:
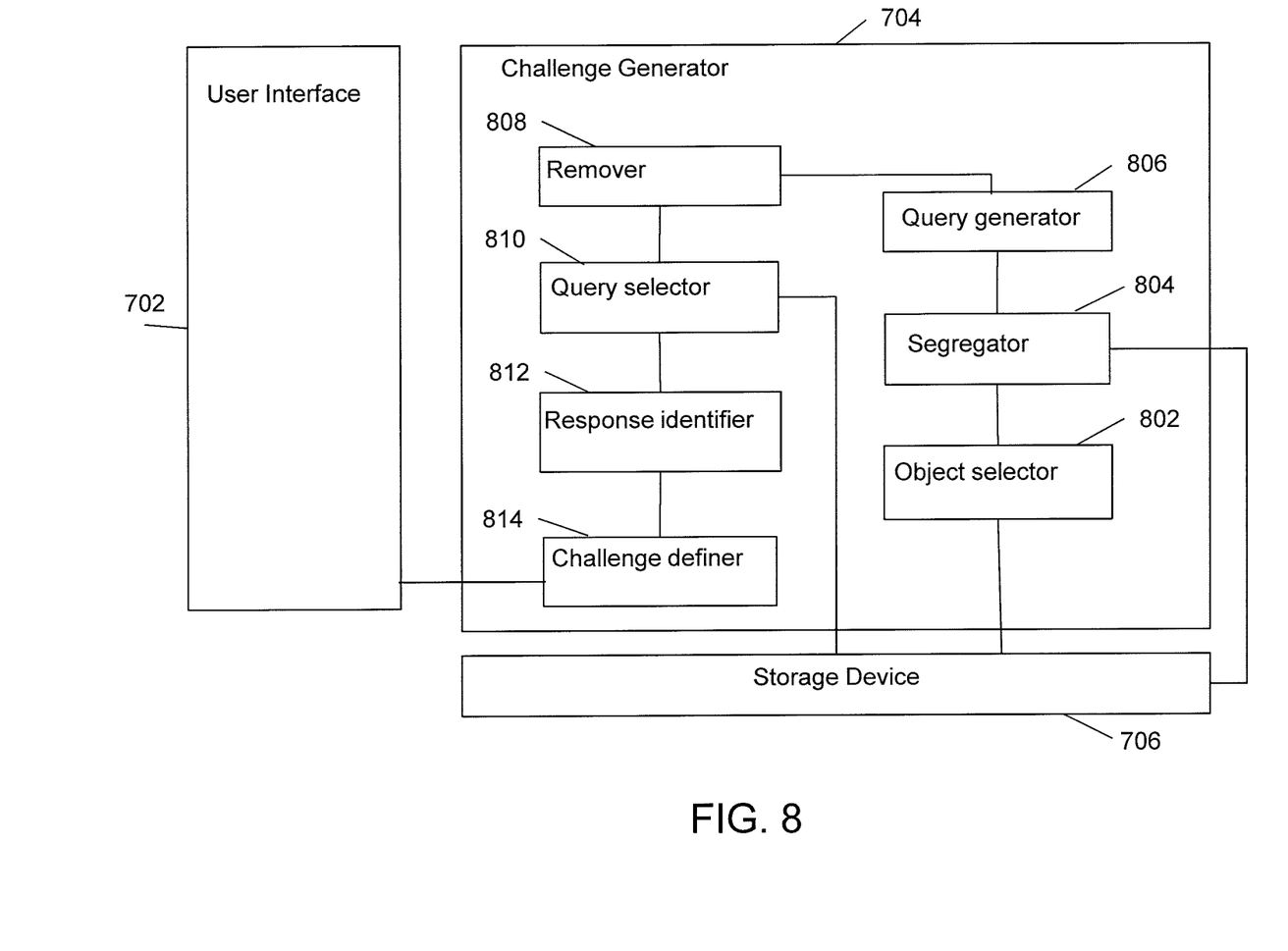
FIG. 8 is a block diagram of challenge generator in accordance with an embodiment of the present invention.

FIG. 8 is a block diagram of challenge generator 704 in accordance with an embodiment of the present invention. Challenge generator 704 includes an object selector 802, a segregator 804, a query generator 806, a remover 808, a query selector 810, a response identifier 812, and a challenge definer 814. Object selector 802 randomly selects a plurality of objects of the objects collected and defined for generating challenges. Segregator 804 assesses the properties of the selected objects and segregates objects based on identical and non-identical properties. Query generator 806 takes inputs from segregator 804 and generates queries based on identical and non-identical properties of objects. Query generator 806 uses a Natural Language Processing (NLP) algorithm to generate the queries. Remover 808 assesses the generated queries and removes the queries that are ambiguous or have non-unique responses. Once the queries with ambiguous or non-unique responses are removed, query selector 810 selects one of the remaining queries randomly for generating the challenge. Response identifier 812 identifies the answer of the selected query and stores the answer in storage device 706. Challenge definer 814 generates the challenge by associating the selected query and the selected objects. The challenge thus generated is presented to user 106 using user interface 702.

An advantage of the present invention is that it dynamically generates a challenge for assurance of human interaction, thereby making the challenge difficult for a computer program to decode.

Another advantage of the present invention is that the challenge is not based on a static logic/hard artificial intelligence, which also makes is difficult for a computer program to break.

Yet another advantage of the present invention is that challenges are not based on usual "text on background" CAPTCHA techniques, thus making the existing OCR-based CAPTCHA decoding techniques ineffective against the challenge generated by the present invention.

The system for generating challenges for assurance of human interaction, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive and an optical disk drive. The storage device can also be other similar means for loading computer programs or other instructions into the computer system. The computer system also includes a communication unit, which enables the computer to connect to other databases and the Internet through an Input/Output (I/O) interface. The communication unit also enables the transfer and reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements to process the input data. The storage elements may also hold data or other information as desired. The storage element may be in the form of an information source or a physical memory element present in the processing machine.

The present invention may also be embodied in a computer program product for generating challenges for assurance of human interaction. The computer program product includes a computer-usable medium having a set program instructions comprising a program code for generating challenges for the assurance of human interaction. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing, or a request made by another processing machine.

While the preferred embodiments of the invention have been illustrated and described, it will be clear that the invention is not limit to these embodiments only. Numerous modifications, changes, variations, substitutions, and equivalents will be apparent to those skilled in the art without departing from the spirit and scope of the invention, as described in the claims.

What is claimed is:

1. A method for dynamically checking for human interaction prior to providing access to a resource in a computing environment via a microprocessor, the microprocessor executing program instructions stored in a memory, the method comprising:
    a. collecting a plurality of objects;
    b. defining a plurality of properties for each of the plurality of objects;
    c. selecting a set of objects from the plurality of objects;
    d. generating a plurality of queries based on the plurality of properties of the selected objects;
    e. analyzing each of the plurality of generated queries to identify one or more queries which have non-unique responses;
    f. removing from the plurality of generated queries, the identified one or more queries having non-unique responses, wherein the non-unique responses have more than one correct answer;
    g. selecting a first query from the remaining plurality of generated queries;
    h. storing an answer to the selected first query, wherein the answer to the selected first query is based on the plurality of properties of the selected objects and comprises a subset of the selected set of objects;
    i. presenting, upon a user trying to gain access to the resource, the selected set of objects and the selected first query to the user;
    j. receiving a user response from the user to the selected first query; and
    k. facilitating the user access to the resource upon validating the received user response against the stored answer to the selected first query.

2. The method of claim 1 further comprising updating the collected plurality of objects and the plurality of properties for each of the plurality of objects.

3. The method of claim 1, wherein the set of objects is selected randomly from the plurality of objects.

4. The method of claim 1, wherein the plurality of queries is generated based on identical properties of objects in the selected set of objects.

5. The method of claim 1, wherein the plurality of queries is generated based on non-identical properties of objects in the selected set of objects.

6. The method of claim 1, wherein the plurality of queries is generated using a Natural Language Processing algorithm.

7. The method of claim 1, wherein one of the plurality of queries is selected randomly.

8. The method of claim 1 further comprising denying the user access to the resource when the response from the user is not received within a pre-defined time period.

9. A method for dynamically generating a challenge for checking for human interaction in a computing environment via a microprocessor, the microprocessor executing program instructions stored in a memory, the method comprising:
    a. selecting a set of objects from a plurality of objects, wherein the plurality of objects and a plurality of properties for each of the plurality of objects are pre-defined and are stored in a storage device;
    b. segregating identical and non-identical properties of the selected set of objects;
    c. generating a plurality of queries based on the segregated properties of the selected objects;
    d. analyzing each of the plurality of generated queries to identify one or more queries which have non-unique responses;
    e. removing from the plurality of generated queries, the identified one or more queries having non-unique responses, wherein the non-unique responses have more than one correct answer;
    f. selecting a first query from the remaining plurality of generated queries;
    g. defining an answer to the selected first query and storing the answer to the selected first query in the storage device, wherein the answer to the selected first query is based on the plurality of properties of the selected objects and comprises a subset of the selected set of objects; and
    h. defining the challenge by associating the selected first query and the selected set of objects, and presenting the selected set of objects associated with the selected first query to a user.

10. A system for checking human interaction dynamically to access a resource in a computing environment, the system comprising:
    a. a storage device, storing a plurality of objects and a plurality of properties for each of the plurality of objects;
    b. a processor executing a challenge generator, dynamically generating a challenge based on objects and their plurality of properties;
    c. a user interface, presenting the challenge to a user and receiving a response of the user to the challenge; and
    d. a response evaluator, evaluating the response of the user to the challenge and for providing user access to the resource upon validating the response;
    wherein the challenge generator comprises:

i. an object selector, randomly selecting a set of objects from the plurality of objects stored in the storage device;
ii. a segregator, segregating identical and non-identical properties of the selected set of objects;
iii. a query generator, generating a plurality of queries based on the segregated properties;
iv. a remover, analyzing each of the plurality of generated queries to identify one or more queries which have non-unique responses of the queries and remove from the plurality of generated queries, the identified one or more queries having non-unique responses, wherein the non-unique responses have more than one correct answer;
v. a query selector, randomly selecting a first query from the remaining plurality of generated queries;
vi. a response identifier, defining an answer to the selected first query and storing the answer to the selected first query in the storage device, wherein the answer to the selected first query comprises a subset of the selected set of objects and based on the plurality of properties of the selected set objects; and
vii. a challenge definer, defining the challenge by associating the selected first query with the selected set of objects, the challenge being presented to the user by the user interface.

11. The system of claim 10, wherein the storage device further stores the answer to the challenge, the answer to the challenge being used by the response evaluator to validate the response of the user to the challenge.

12. The system of claim 11, wherein the user interface further facilitates in updating the plurality of objects, the plurality of properties for each of the plurality of objects stored in the storage device.

13. The system of claim 10, wherein the query generator generates the plurality of queries using a Natural Language Processing algorithm.

14. The system of claim 10, wherein the response evaluator comprises a time recorder recording the response time of the user, wherein the user is not provided access to the resource when the response of the user is not received within a pre-defined time period.

15. A computer program product for use with a computer, the computer program product comprising a non-transitory computer usable medium, the non-transitory computer usable medium including a memory and having a computer readable program code embodied therein for dynamically checking for human interaction prior to providing access to a resource in a computing environment, the computer readable program code performing:
a. selecting a set of objects from a plurality of objects, wherein the plurality of objects and a plurality of properties for each of the plurality of objects are predefined;
b. generating a plurality of queries based on the plurality of properties of the selected objects;
c. analyzing each of the plurality of generated queries to identify one or more queries which have non-unique responses;
d. removing from the plurality of generated queries, the identified one or more queries having non-unique responses, wherein the non-unique responses have more than one correct answer
e. selecting a first query from the plurality of generated queries;
f. storing an answer to the selected first query, wherein the answer to the selected first query is based on the plurality of properties of the selected objects and comprises a subset of the selected set of objects;
g. presenting, upon a user trying to gain access to the resource, the selected set of objects and the selected first query to the user;
h. receiving a user response from the user to the selected first query; and
i. providing the user access to the resource upon validating the received response against the stored answer of the selected first query, wherein a to i are repeated when a user tries to access the resource.

16. The computer readable program code of claim 15 wherein the set of objects is selected randomly from the plurality of objects.

17. The computer readable program code of claim 15 wherein the plurality of queries are generated based on identical properties of objects in the selected set of objects.

18. The computer readable program code of claim 15 further performing generating a plurality of queries based on non-identical properties of objects in the selected set of objects.

19. The computer readable program code of claim 15 further performing generating a plurality of queries is based on a Natural Language Processing algorithm.

20. The computer readable program code of claim 15 further performing selecting one of the plurality of queries by randomly selecting one of the plurality of queries.

21. A computer program product for use with a computer, the computer program product comprising a non-transitory computer usable medium, the non-transitory computer usable medium including a memory and having a computer readable program code embodied therein, dynamically generating a challenge for checking for human interaction in a computing environment, the computer readable program code performing:
a. selecting a set of objects from a plurality of objects, wherein the plurality of objects and a plurality of properties for each of the plurality of objects are predefined and are stored in a storage device;
b. segregating identical and non-identical properties of the selected set of objects;
c. generating a plurality of queries based on the segregated properties of the selected objects;
d. analyzing each of the plurality of generated queries to identify one or more queries which have non-unique responses;
e. removing from the plurality of generated queries, the identified one or more queries having non-unique responses, wherein the non-unique responses have more than one correct answer
f. selecting a first query from the remaining plurality of generated queries;
g. defining an answer to the selected first query and storing in the storage device, wherein the answer is based on the properties of the selected objects and comprises a subset of the selected set of objects; and
h. defining the challenge by associating the selected first query and the selected set of objects, and presenting the selected set of objects and the selected first query to a user.

* * * * *